(12) United States Patent
Mehra

(10) Patent No.: US 10,728,657 B2
(45) Date of Patent: Jul. 28, 2020

(54) ACOUSTIC TRANSFER FUNCTION PERSONALIZATION USING SIMULATION

(71) Applicant: Facebook Technologies, LLC, Menlo Park, CA (US)

(72) Inventor: Ravish Mehra, Tacoma, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/440,166

(22) Filed: Jun. 13, 2019

(65) Prior Publication Data
US 2019/0394565 A1    Dec. 26, 2019

Related U.S. Application Data

(60) Provisional application No. 62/688,665, filed on Jun. 22, 2018.

(51) Int. Cl.
| | | |
|---|---|---|
| *H04R 3/00* | (2006.01) | |
| *H04R 1/40* | (2006.01) | |
| *G06T 7/50* | (2017.01) | |
| *G06T 7/90* | (2017.01) | |
| *H04R 1/04* | (2006.01) | |
| *G06T 7/60* | (2017.01) | |

(52) U.S. Cl.
CPC ............... *H04R 3/005* (2013.01); *G06T 7/50* (2017.01); *G06T 7/60* (2013.01); *G06T 7/90* (2017.01); *H04R 1/04* (2013.01); *H04R 1/406* (2013.01); *G06T 2207/30196* (2013.01)

(58) Field of Classification Search
CPC .......... H04R 3/005; H04R 1/04; H04R 1/406; H04R 2430/20; G06T 7/50; G06T 7/90; G06T 7/60; G06T 2207/30196; H04S 7/304; H04S 2420/01; G01H 7/00
See application file for complete search history.

(56) References Cited

U.S. PATENT DOCUMENTS

| | | | |
|---|---|---|---|
| 2012/0183161 A1 | 7/2012 | Agevik et al. | |
| 2017/0164129 A1* | 6/2017 | Norris | H04M 1/72572 |
| 2017/0272890 A1* | 9/2017 | Oh | H04S 7/304 |
| 2018/0262849 A1* | 9/2018 | Farmani | H04R 1/1083 |
| 2018/0367937 A1 | 12/2018 | Asada et al. | |
| 2019/0087972 A1* | 3/2019 | Huttunen | G06K 9/00201 |

* cited by examiner

*Primary Examiner* — Yogeshkumar Patel
(74) *Attorney, Agent, or Firm* — Fenwick & West LLP

(57) ABSTRACT

An image of at least a portion of a head of a user is received. A geometry is generated of the head wearing an eyewear device based in part on the received image of the head and a geometry of the eyewear device. The geometry of the eyewear device includes a microphone array composed of a plurality of acoustic sensors that are configured to detect sounds within a local area surrounding the microphone array. A simulation is performed of sound propagation between an audio source and the plurality of acoustic sensors based on the generated geometry. An acoustic transfer function (ATF) is determined associated with the microphone array based on the simulation. The determined ATF is customized to the user, and is provided to the eyewear device of the user.

20 Claims, 8 Drawing Sheets

ACOUSTIC TRANSFER FUNCTION PERSONALIZATION USING SIMULATION

CROSS REFERENCE TO RELATED APPLICATION

This application claims the benefit of U.S. application Ser. No. 62/688,665 filed on Jun. 22, 2018, which is hereby incorporated by reference in its entirety.

BACKGROUND

A microphone array includes a plurality of acoustic sensors. Sound propagation from sources to the acoustic sensors can vary based on the environment the microphone array is located in. For example, sound perceived by the microphone array may be different in a room versus in an open space. And it follows that a microphone array worn by two different users could perceive sound differently due to differences in the user's geometry. An acoustic transfer function (ATF) characterizes how the microphone array receives a sound from a point in space. Accordingly, ATFs for the microphone array can vary from user to user.

SUMMARY

Embodiments relate to a method for obtaining acoustic transfer functions (ATFs) through performing simulation using images of a user's head wearing an eyewear device that includes a microphone array. An image is received of at least a portion of a head of a user. In some embodiments, the received image is of the head earing the eyewear device. A geometry is generated of the head wearing an eyewear device based in part on the received image of the head and a geometry of the eyewear device. The geometry of the eyewear device includes a microphone array composed of a plurality of acoustic sensors that are configured to detect sounds within a local area surrounding the microphone array. A simulation is performed of sound propagation between an audio source and the plurality of acoustic sensors based on the generated geometry. An ATF is determined that is associated with the microphone array based on the simulation. The determined ATF is customized to the user and the microphone array associated with the eyewear device. The customized ATF may be provided to the eyewear device of the user.

In some embodiments, a computer-readable medium includes instructions to perform the above method. Likewise, in some embodiments, a system is configured to perform the above method.

DETAILED DESCRIPTION

Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

An eyewear device includes an audio system that includes a microphone array. The microphone array is configured to detect sounds within a local area surrounding the microphone array. The eyewear device may operate in a calibration mode. In the calibration mode, acoustic transfer function (ATF) calibration is performed. An ATF characterizes how the microphone array receives a sound from a point in space. In one embodiment, a system may perform ATF simulation using a geometry of a head of the user and a geometry of the eyewear device including the microphone array. The geometries of the head and/or the eyewear device may be obtained using an imaging device (e.g., HMD with a depth camera assembly, mobile device with a camera, etc.). In some embodiments, the geometry of the eyewear device may be obtained from some other source.

System Environment for Determining HRTFs

Figure 1:
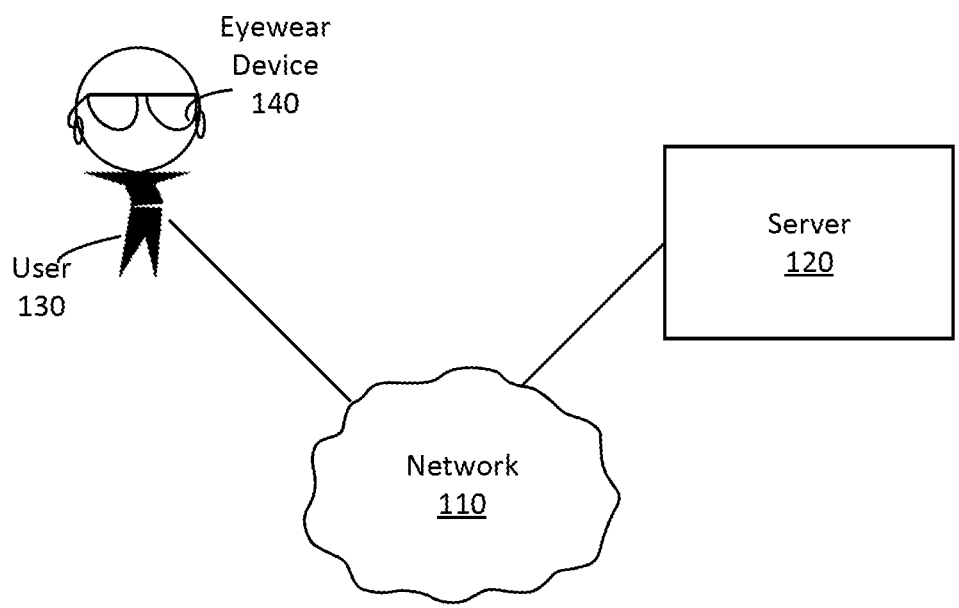
FIG. 1 is a schematic diagram of a system using images of a user to determine ATFs associated with an eyewear device, in accordance with one or more embodiments.

FIG. 1 is a schematic diagram of a system 100 using images of a user 130 to determine ATFs associated with an eyewear device 140, in accordance with an embodiment. The eyewear device 140 includes an audio system (not shown). The audio system detects audio feedback to generate one or more transfer functions for the user 130. The audio system includes a microphone array that includes a plurality of acoustic sensors. Each acoustic sensor is configured to detect sounds within a local area surrounding the microphone array. In some embodiments, some of the plurality of acoustic sensors are coupled to a neckband coupled to the eyewear device 140. As the user moves throughout the local area surrounding the user, the microphone array detects sounds.

The audio system is configured to estimate a direction of arrival (DoA) of a sound detected by the microphone array relative to a position of the eyewear device 140 within the local area. The audio system generates and/or updates a transfer function for a source location of a detected sound relative to the position of the eyewear device 140. A transfer function characterizes how a sound is received from a point in space. Specifically, a transfer function defines the relationship between parameters of a sound at its source location and the parameters at which the sound is detected by, for example, a microphone array or an ear of a user. The transfer function may be, e.g., an acoustic transfer function (ATF) and/or a head-related transfer function (HRTF).

An ATF characterizes how an acoustic sensor receives a sound from a point in space. Specifically, the ATF defines the relationship between parameters of a sound at its source location and the parameters at which the acoustic sensor array detected the sound. Parameters associated with the sound may include frequency, amplitude, duration, a DoA estimation, etc. In some embodiments, at least some of the acoustic sensors of the microphone array are coupled to an eyewear device that is worn by a user. The ATF for a particular source location relative to the acoustic sensor of the microphone array may differ from user to user due to a person's anatomy (e.g., ear shape, shoulders, etc.) that affects the sound as it travels to the person's ears. Accordingly, the ATFs of the microphone array are personalized for each user wearing the eyewear device.

The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. For example, the audio system may generate two HRTFs for the user, one for each ear. An HRTF or a pair of HRTFs can be used to create audio content that includes sounds that seem to come from a specific point in space. Several HRTFs may be used to create surround sound audio content (e.g., for home entertainment systems, theater speaker systems, an immersive environment, etc.), where each HRTF or each pair of HRTFs corresponds to a different point in space such that audio content seems to come from several different points in space.

The user 130 wears the eyewear device 140 that is connected to a server 120 through a network 110. Images of the user's 130 head are captured using an imaging device. The imaging device may be a camera on the eyewear device 140, a depth camera assembly 140 that is part of the eyewear device 140, an external camera (e.g., part of a smartphone), an external DCA, some other device configured to capture images and/or depth information, or some combination thereof In some embodiments, the imaging device is also used to capture images of the eyewear device 140 and the microphone array located on the eyewear device 140.

The images are sent to a server 120 through the network 110. The images may be, e.g., images of the head of the user, images of the head wearing the eyewear device 140, images of the eyewear device 140 in isolation, images of the microphone array, or some combination thereof. The network 110 may be any suitable communications network for data transmission. The network 103 is typically the Internet, but may be any network, including but not limited to a Local Area Network (LAN), a Metropolitan Area Network (MAN), a Wide Area Network (WAN), a mobile wired or wireless network, a private network, or a virtual private network. In some example embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI express Advanced Switching, etc. In some example embodiments, the entities use custom and/or dedicated data communications technologies instead of, or in addition to, the ones described above.

The server 120 receives and uses the plurality of images to determine a plurality of ATFs customized for the user 130 and the eyewear device 140. For this purpose, the server 120 generates a geometry of the user's 130 head wearing the eyewear device 140. The geometry is used to perform a simulation, as described below in detail with reference to FIG. 3. The simulation models sound propagation between acoustic sensors of the microphone array of the eyewear device 140 and various locations within a simulated local area. The simulation is used to determine ATFs for the microphone array that correspond to each of the various locations. Note that the determined ATFs are customized to the geometry that was generated using images of the user. Accordingly, the determined ATFs are customized to the user. The customized ATFs are sent through the network 110 to the eyewear device 140. The eyewear device 140 uses the customized ATFs to optimize performance of the audio system. The customized ATFs may be used to, e.g., improve DoA determination by the microphone array and/or beam forming.

Figure 2A:
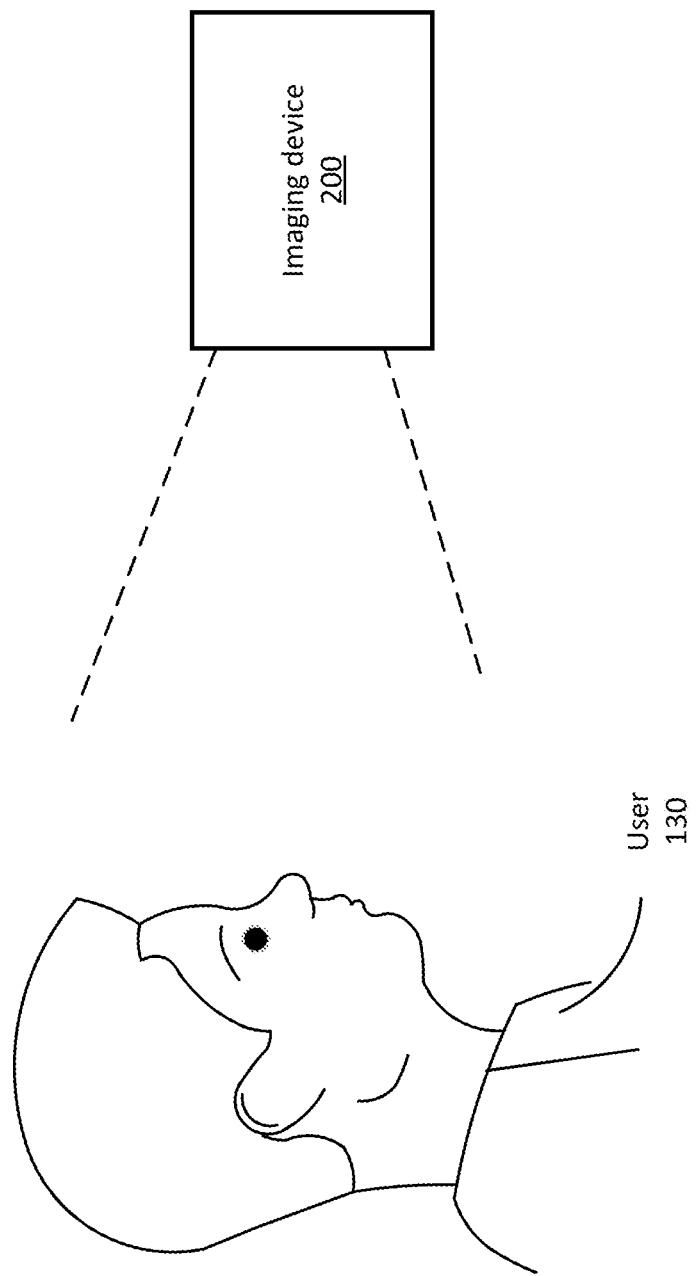
FIG. 2A is an example view of an imaging device capturing an image of a head of a user, in accordance with one or more embodiments.

FIG. 2A is an example view of an imaging device 200 capturing an image of a head of the user 130, in accordance with one or more embodiments. The imaging device 200 may be a camera on an eyewear device, a depth camera assembly (DCA) that is part of an eyewear device, an external camera (e.g., part of a smartphone), an external DCA (e.g., coupled to a console), some other device configured to capture images and/or depth information, or some combination thereof.

As noted above, in some embodiments, the imaging device 200 includes a depth camera assembly (DCA) that captures images of the user 130 including the user's head. In some embodiments, the DCA determines depth information for the head of the user 130 using the captured images. Depth information describes distances between surfaces in the captured image and the DCA. The DCA may determine depth information using one or a combination of the following techniques: stereo vision, photometric stereo, time-of-flight (ToF), and structured light (SL). The DCA can compute the depth information from the captured images, or send the captured images to a server (e.g., the server 120) to extract the depth information.

In embodiments where the imaging device 200 does not include a DCA, the imaging device 200 provides the captured images to the server 130 or some other device and/or console to determine depth information.

To capture the user's head more accurately, the user 130 (or some other party) positions the imaging device 200 in different positions relative to their head, such that the captured images cover different portions of the head of the user 130. The user 130 may hold the imaging device 200 at different angles and/or distances relative to the user 130. For example, the user 130 may hold the imaging device 200 at arm's length directly in front of the user's 130 face and use the imaging device 200 to capture images of the user's 130 face. The user 130 may also hold the imaging device 200 at a distance shorter than arm's length with the imaging device 200 pointed towards the side of the user's 130 head to capture an image of the user's 130 ear and/or shoulder. The imaging device 200 may run a feature recognition software and capture an image automatically when features of interest (e.g., ear, shoulder) are recognized or receive an input from the user to capture the image.

In some embodiments, the imaging device 200 may have an application that has a graphical user interface (GUI) that guides the user 130 to capture the plurality of images of the user's 130 head from specific angles and/or distances relative to the user 130. For example, the GUI may request a front-facing image of the user's 130 face, an image of the user's 130 right ear, and an image of the user's 130 left ear.

While FIG. 2A illustrates the imaging device 200 capturing images of the head of the user 130. In some embodiments, the imaging device 200 is also used to capture images of the eyewear device 140 as it is being worn on the user. The images include at least some portions of the eyewear device 140 that include the microphone array.

Figure 2B:
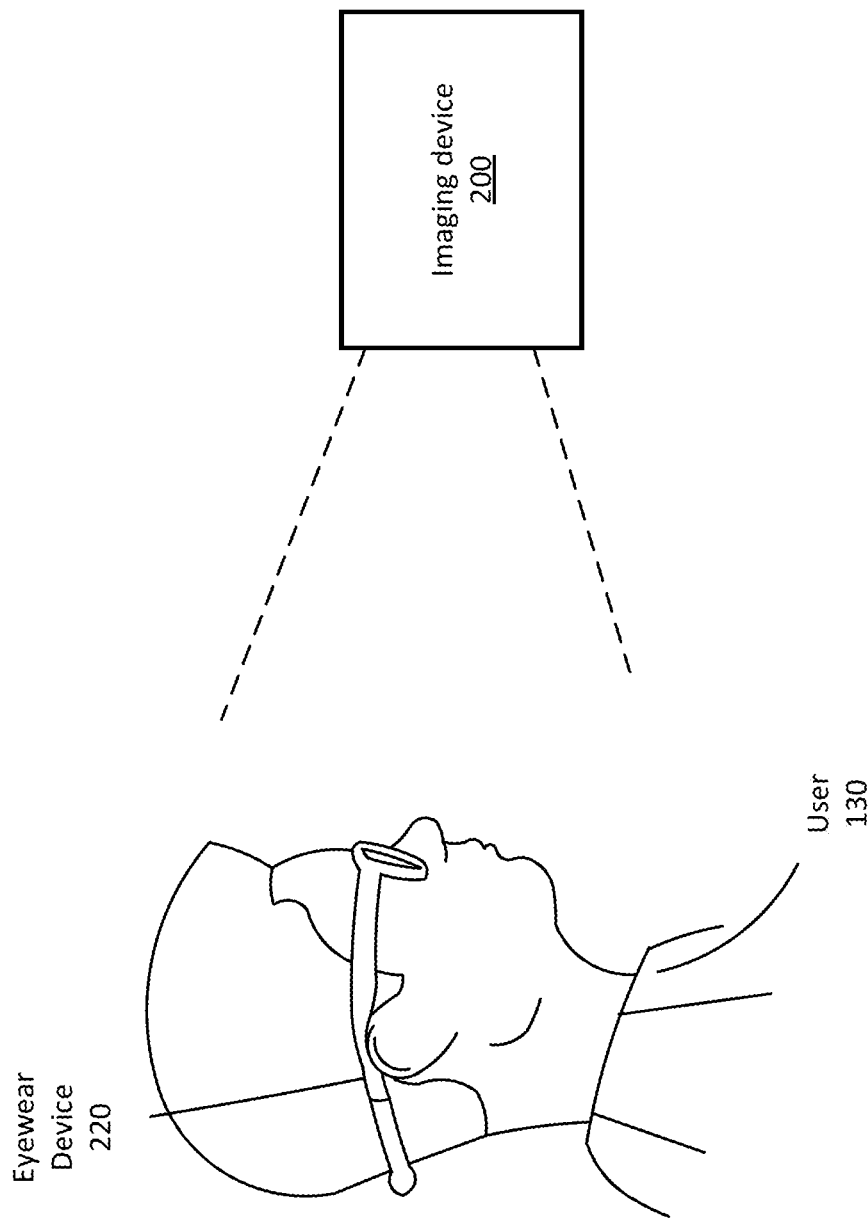
FIG. 2B is an example view of the imaging device capturing images of a head of the user that is wearing an eyewear device, in accordance with one or more embodiments.

FIG. 2B is an example view of the imaging device 200 capturing images of a head of the user 130 that is wearing an eyewear device 220, in accordance with one or more embodiments. The eyewear device 220 may be an embodiment of the eyewear device 140, or some near-eye display that includes a microphone array, or some head-mounted display that includes a microphone array. FIG. 2B is substantially similar to FIG. 2A except that the determined depth information describes the user's head while wearing the eyewear device 220.

Figure 2C:
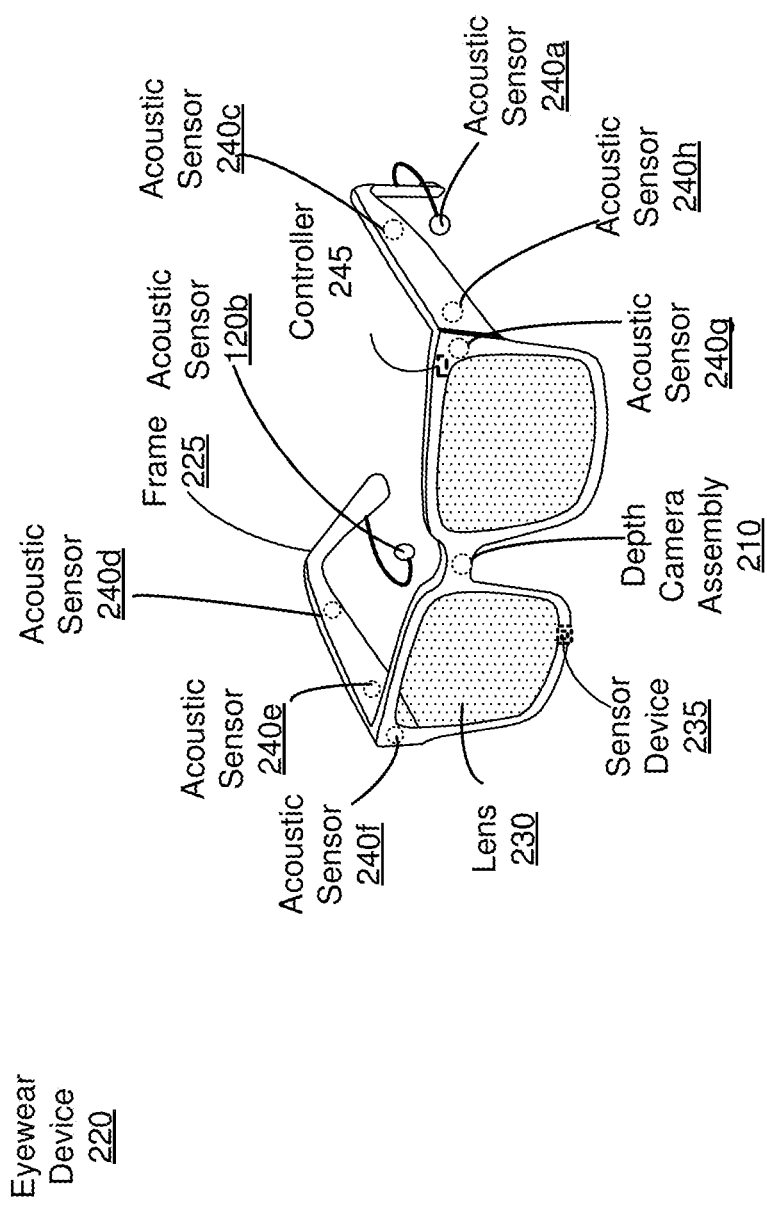
FIG. 2C is the eyewear device including an audio system, in accordance with one or more embodiments.

FIG. 2C is the eyewear device 220 including an audio system, in accordance with one or more embodiments. The eyewear device 220 presents media to a user. In one embodiment, the eyewear device 220 may be a near-eye display (NED). Examples of media presented by the eyewear device 220 include one or more images, video, audio, or some combination thereof. The eyewear device 220 may include, among other components, a frame 225, a lens 230, a sensor device 235, and an audio system. The audio system includes, among other components, a microphone array of one or more acoustic sensors 240 and a controller 245. While FIG. 1 illustrates the components of the eyewear device 220 in example locations on the eyewear device 220, the components may be located elsewhere on the eyewear device 220, on a peripheral device paired with the eyewear device 220, or some combination thereof.

The eyewear device 220 may correct or enhance the vision of a user, protect the eye of a user, or provide images to a user. The eyewear device 220 may be eyeglasses which correct for defects in a user's eyesight. The eyewear device 220 may be sunglasses which protect a user's eye from the sun. The eyewear device 220 may be safety glasses which protect a user's eye from impact. The eyewear device 220 may be a night vision device or infrared goggles to enhance a user's vision at night. The eyewear device 220 may be a near-eye display that produces artificial reality content for the user. Alternatively, the eyewear device 220 may not include a lens 230 and may be a frame 225 with an audio system that provides audio (e.g., music, radio, podcasts) to a user.

The frame 225 includes a front part that holds the lens 230 and end pieces to attach to the user. The front part of the frame 225 bridges the top of a nose of the user. The end pieces (e.g., temples) are portions of the frame 225 that hold the eyewear device 220 in place on a user (e.g., each end piece extends over a corresponding ear of the user). The length of the end piece may be adjustable to fit different users. The end piece may also include a portion that curls behind the ear of the user (e.g., temple tip, ear piece).

The lens 230 provides or transmits light to a user wearing the eyewear device 220. The lens 230 may be prescription lens (e.g., single vision, bifocal and trifocal, or progressive) to help correct for defects in a user's eyesight. The prescription lens transmits ambient light to the user wearing the eyewear device 220. The transmitted ambient light may be altered by the prescription lens to correct for defects in the user's eyesight. The lens 230 may be a polarized lens or a tinted lens to protect the user's eyes from the sun. The lens 230 may be one or more waveguides as part of a waveguide display in which image light is coupled through an end or edge of the waveguide to the eye of the user. The lens 230 may include an electronic display (e.g., a waveguide display) for providing artificial reality content to the user. The lens 230 is held by a front part of the frame 225 of the eyewear device 220.

In some embodiments, the eyewear device 220 may include a depth camera assembly (DCA) that captures data describing depth information for a local area surrounding the eyewear device 220. In one embodiment, the DCA may include a structured light projector, an imaging device, and a controller. The captured data may be images captured by the imaging device of structured light projected onto the local area by the structured light projector. In one embodiment, the DCA may include two or more cameras that are oriented to capture portions of the local area in stereo and a controller. The captured data may be images captured by the two or more cameras of the local area in stereo. The controller computes the depth information of the local area using the captured data. Based on the depth information, the controller determines absolute positional information of the eyewear device 220 within the local area. The DCA may be integrated with the eyewear device 220 or may be positioned within the local area external to the eyewear device 220. In the latter embodiment, the controller of the DCA may transmit the depth information to the controller 245 of the eyewear device 220.

The sensor device 235 generates one or more measurement signals in response to motion of the eyewear device 220. The sensor device 235 may be located on a portion of the frame 225 of the eyewear device 220. The sensor device 235 may include one or more position sensors, an inertial measurement unit (IMU), or some combination thereof. Some embodiments of the eyewear device 220 may or may not include the sensor device 235 or may include more than one sensor device 235. In embodiments in which the sensor device 235 includes an IMU, the IMU generates IMU data based on measurement signals from the sensor device 235. Examples of sensor devices 115 include: one or more accelerometers, one or more gyroscopes, one or more magnetometers, another suitable type of sensor that detects motion, a type of sensor used for error correction of the IMU, or some combination thereof. The sensor device 235 may be located external to the IMU, internal to the IMU, or some combination thereof.

Based on the one or more measurement signals, the sensor device 235 estimates a current position of the eyewear device 220 relative to an initial position of the eyewear device 220. The estimated position may include a location of the eyewear device 220 and/or an orientation of the eyewear device 220 or the user's head wearing the eyewear device 220, or some combination thereof. The orientation may correspond to a position of each ear relative to the reference point. In some embodiments, the sensor device 235 uses the depth information and/or the absolute positional information from a DCA to estimate the current position of the eyewear device 220. The sensor device 235 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the eyewear device 220 from the sampled data. For example, the IMU integrates the measurement signals received from the accelerometers over time to estimate a velocity vector and integrates the velocity vector over time to determine an estimated position of a reference point on the eyewear device 220. Alternatively, the IMU provides the sampled measurement signals to the controller 245, which determines the fast calibration data. The reference point is a point that may be used to describe the position of the eyewear device 220. While the reference point may generally be defined as a point in space, however, in practice the reference point is defined as a point within the eyewear device 220.

A transfer function characterizes how a sound is received from a point in space. The transfer functions may be acoustic transfer functions (ATFs), head-related transfer functions (HRTFs), or some combination thereof. The one or more transfer functions may be associated with the eyewear device 220, the user wearing the eyewear device 220, or both. The audio system may then use the one or more transfer functions to generate audio content for the user. The audio system of the eyewear device 220 includes a microphone array and the controller 245.

The microphone array detects sounds within a local area surrounding the microphone array. The microphone array includes a plurality of acoustic sensors. The acoustic sensors are sensors that detect air pressure variations of a sound wave. Each acoustic sensor is configured to detect sound and convert the detected sound into an electronic format (analog or digital). The acoustic sensors may be acoustic wave sensors, microphones, sound transducers, or similar sensors that are suitable for detecting sounds. For example, in FIG. 2C, the microphone array includes eight acoustic sensors: acoustic sensors 240a, 240b, which may be designed to be placed inside a corresponding ear of the user, and acoustic sensors 240c, 240d, 240e, 240f, 240g, 240h, which are positioned at various locations on the frame 225. The acoustic sensors 240a-240h may be collectively referred to herein as "acoustic sensors 240."

The microphone array detects sounds within the local area surrounding the microphone array. The local area is the environment that surrounds the eyewear device 220. For example, the local area may be a room that a user wearing the eyewear device 220 is inside, or the user wearing the eyewear device 220 may be outside and the local area is an outside area in which the microphone array is able to detect sounds.

The configuration of the acoustic sensors 240 of the microphone array may vary. While the eyewear device 220 is shown in FIG. 2C as having eight acoustic sensors 240, the number of acoustic sensors 240 may be increased or decreased. Increasing the number of acoustic sensors 240 may increase the amount of audio information collected and the sensitivity and/or accuracy of the audio information. Decreasing the number of acoustic sensors 240 may decrease the computing power required by the controller 245 to process the collected audio information. In addition, the position of each acoustic sensor 120 of the microphone array may vary, and in some cases can be located off the eyewear device 220. The position of an acoustic sensor 120 may include a defined position on the user, a defined coordinate on the frame 225, an orientation associated with each acoustic sensor, or some combination thereof. For example, the acoustic sensors 240a, 240b may be positioned on a different part of the user's ear, such as behind the pinna or within the auricle or fossa, or there may be additional acoustic sensors on or surrounding the ear in addition to the acoustic sensors 240 inside the ear canal. Having an acoustic sensor (e.g., acoustic sensors 240a, 240b) positioned next to an ear canal of a user enables the microphone array to collect information on how sounds arrive at the ear canal. The acoustic sensors 240 on the frame 225 may be positioned along the length of the temples, across the bridge, above or below the lenses 230, or some combination thereof. The acoustic sensors 240 may be oriented such that the microphone array is able to detect sounds in a wide range of directions surrounding the user wearing the eyewear device 220.

The controller 245 processes information from the microphone array that describes sounds detected by the microphone array. The information associated with each detected sound may include a frequency, an amplitude, and/or a duration of the detected sound. For each detected sound, the controller 245 performs a DoA estimation. The DoA estimation is an estimated direction from which the detected sound arrived at an acoustic sensor of the microphone array. If a sound is detected by at least two acoustic sensors of the microphone array, the controller 245 can use the known positional relationship of the acoustic sensors and the DoA estimation from each acoustic sensor to estimate a source location of the detected sound, for example, via triangulation. The accuracy of the source location estimation may increase as the number of acoustic sensors that detected the sound increases and/or as the distance between the acoustic sensors that detected the sound increases.

Accuracy of the DoA estimation is based in part on the ATF of the microphone array. The ATF for a particular source location relative to the microphone array may differ from user to user due to a person's anatomy (e.g., ear shape, shoulders, etc.) that affects the sound as it travels to the person's ears. Accordingly, the ATFs of the microphone array are personalized for each user wearing the eyewear device. The eyewear device 220 receives a plurality of ATFs customized for the user 130 wearing the eyewear device 220. The customized ATFs are sent through a network (e.g., the network 110) to the eyewear device 220. The controller 245 of the eyewear device 220 uses the customized ATFs to optimize performance of the audio system. The customized ATFs may be used to, e.g., improve DoA determination by the microphone array and/or beam forming.

The controller 245 generates one or more HRTFs based on the DoA estimation. The HRTF for a particular source location relative to a person is unique to each ear of the person (and is unique to the person) due to the person's anatomy (e.g., ear shape, shoulders, etc.) that affects the sound as it travels to the person's ears. An HRTF or a pair of HRTFs can be used to create audio content that includes sounds that seem to come from a specific point in space. Several HRTFs may be used to create surround sound audio content (e.g., for home entertainment systems, theater speaker systems, an immersive environment, etc.), where each HRTF or each pair of HRTFs corresponds to a different point in space such that audio content seems to come from several different points in space.

Example Architecture of Server for Determining HRTFs

Figure 3:
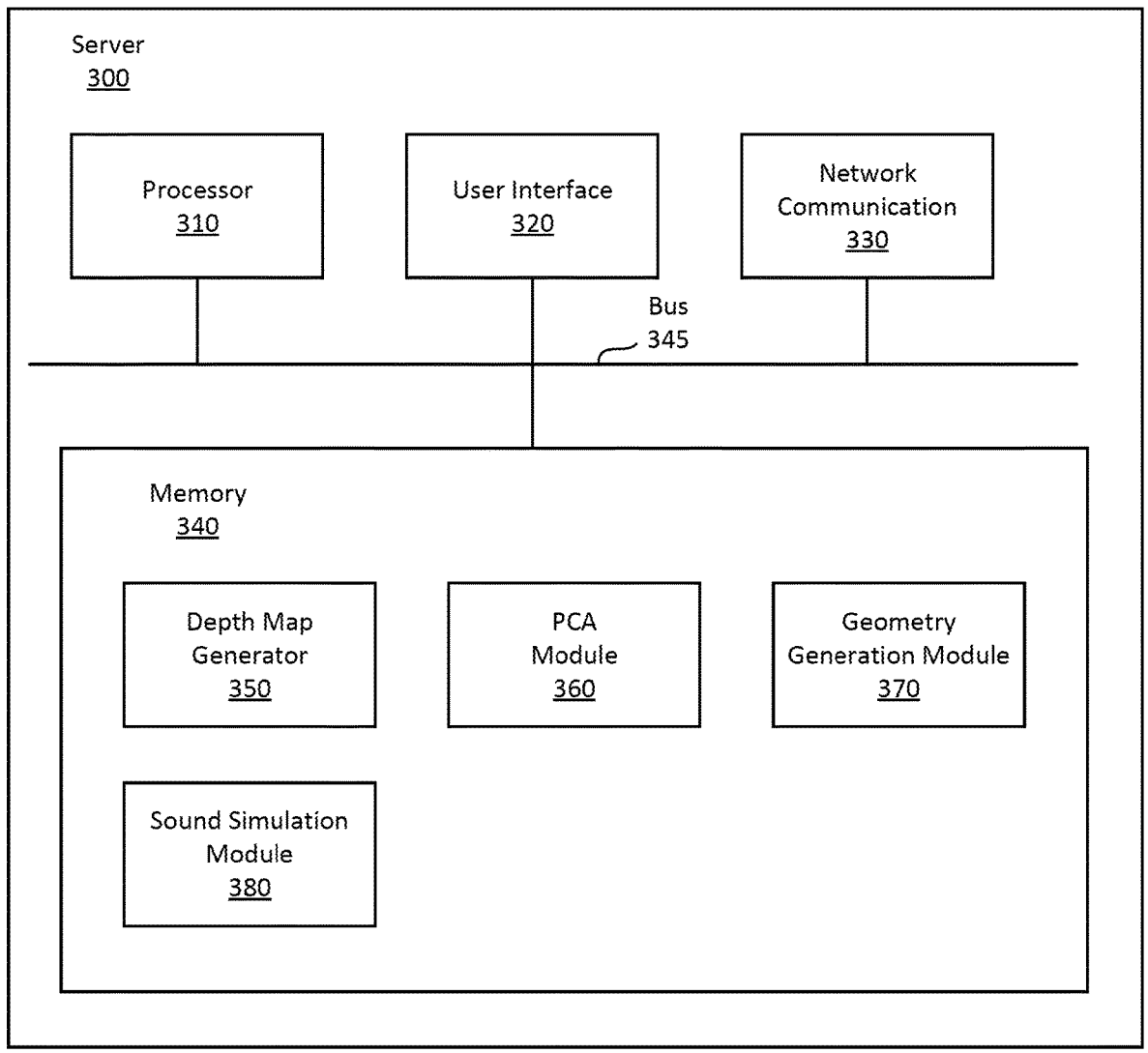
FIG. 3 is a block diagram of the server for determining customized ATFs, in accordance with one or more embodiments.

FIG. 3 is a block diagram of the server 300 for determining customized ATFs, in accordance with one or more embodiments. The server 120 is an embodiment of the server 300. The server 300 may include, among other components, a processor 310, a user interface 320, a network communication module 370, a memory 340, and a bus 345 connecting these components. Some embodiments of the server 300 have different components than those described here. Similarly, in some cases, functions can be distributed among the components in a different manner than is described here. The server 300 may include components not illustrated in FIG. 3 such as a power source, a display device, or a speaker.

The processor 310 is a hardware component that executes instructions to perform various operations. Although a single processor 310 is illustrated in FIG. 3, two or more processors may be used in the server 300 for expanded computing capacity.

The user interface 320 is software, hardware, firmware or a combination thereof for interfacing with a user of the server 300. The user interface 320 may include input devices such as keyboard and pointing devices (e.g., mouse).

The network communication module 330 is hardware or hardware in combination with software and firmware that enables the server 300 to communicate with the eyewear device 200 or other sources of the user's image via the network 110. The network communication module 330 may be embodied, for example, as a network card.

The memory 340 is a non-transient medium for storing software modules and various data. The memory 340 may include, among other modules, a depth map generator 350, a principal component analysis (PCA) module 360, a geometry generation module 370, and a sound simulation module 380. The functions can be distributed among the modules and/or different entities in a different manner than is described here. In some embodiments, some or all the functionality of the modules in the memory 340 may be provided by an HMD (e.g., eyewear device 220).

The depth map generator 350 is a software module that receives images from one or more eyewear devices (e.g., the eyewear device 220). The images, and associated depth information (if present), may be of a user's head, of a user's head wearing an eyewear device (e.g., the eyewear device 220), of the eyewear device 220, or some combination thereof. The depth map generator 350 generates one or more depth maps from the plurality of images. For example, the depth map generator 350 may extract information about the user's head from the plurality of images received from the imaging device 210. The information may include depth information which is used to determine the positions of features on the user's head. The depth map generator 350 may create a depth map of the user's head and determine the relative position of the user's features. The depth map indicates the position or spatial relationship between the features of interest from the images of the user's head. For example, the depth map may indicate the distance between the user's left ear and right ear or the position of the user's ears relative to other features such as eyes and shoulders. In a similar manner, the depth map generator 350 may be used to create a depth map of the user's head wearing an eyewear device from images of the head wearing the eyewear device. And in some embodiments, the depth map generator 350 may be used to create a depth map of the eyewear device (and its microphone array) using images received of the eyewear device in isolation (i.e., not being worn by the user).

In some embodiments, the PCA module 360 determines a PCA model based on head images of human test subjects wearing a test eyewear device that includes a test microphone array, and measured ATFs of the test microphone array. For this purpose, the PCA module 360 receives the images and measured ATFs of the test microphone array, for example, from a database. Based on the received images of the test subjects (e.g., 500-1000 test subjects), the PCA module 360 performs principal component analysis (PCA) which uses orthogonal transformation to determine a set of linearly uncorrelated principal components. For example, the orientation of the eyewear device on the head of the test subjects may be the focus of the PCA.

In some embodiments, the PCA module 360 determines a PCA model based on test images of human test subjects wearing a particular eyewear device and measured ATFs of the test eyewear device. For this purpose, the PCA module 360 receives the test images (or portions thereof) and measured ATFs of the test subjects, for example, from a database. Based on the received test images of the test subjects (e.g., 500-1000 test subjects), the PCA module 360 performs principal component analysis (PCA) which uses orthogonal transformation to determine a set of linearly uncorrelated principal components.

The details of determining the PCA model is discussed below with respect to FIG. 6B. The result of the PCA is then provided to geometry generation module 370. Although PCA module 360 is described as being executed in the server 300 for the sake of convenience, the PCA module 360 may be executed on a separate computing device. In such case, the result of the PCA is processed and provided to the geometry generation module 370 for processing a user's PCA-based head geometry.

The geometry generation module 370 determines a geometry of a user's head based using the depth map generated by the depth map generator 350. The determined geometry may be a 3-dimensional mesh representation of the user's head describing, for example, the position of features of the user's head such as eyes, ears, neck, and shoulders. Alternatively, the determined geometry may be a PCA-based geometry of the user's head where the user's head or a feature of the user's head (e.g., ear shape) is represented as a linear combination of the principal components multiplied with corresponding PCA coefficients. In some embodiments, the geometry of the user's head may include a geometry of an eyewear device worn by the user.

In some embodiments, the geometry generation module 370 determines a geometry of the eyewear device using the depth map generated by the depth map generator 350. The determined geometry may be a 3-dimensional mesh representation of the eyewear device describing, for example, the shape of the eyewear device and the locations of the acoustic sensors of the microphone array on the eyewear device. The geometry generation module 370 may combine the geometry of the user's head with the geometry of the eyewear device to obtain a geometry of the user's head wearing the eyewear device. In some embodiments, the geometry of the eyewear device may be predetermined since the eyewear device worn by the user may have a unique known identifier to identify the device. In some embodiments, the eyewear device worn by the user may be identified from images of the device taken when worn using the imaging device.

The sound simulation module 380 is a software module that uses a computerized model to simulate propagation of sound between an audio source and the microphone array.

The sound simulation module 380 receives a geometry of the user's head wearing the eyewear device from the geometry generation module 370. Based in part on the received geometry, the sound simulation module 380 performs a simulation that includes determining how sound propagates between different locations and the various acoustic sensors of the eyewear device to determine ATFs for the microphone array, as described in detail below with reference to FIG. 4. The sound simulation module 380 provides the determined ATFs for the microphone array to the eyewear device.

ATF Determination Using Three-Dimensional Mesh Model

Figure 4:
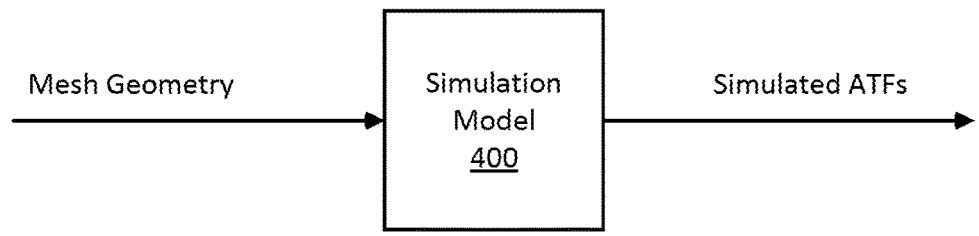
FIG. 4 is a conceptual diagram that illustrates simulating HRTFs based on three-dimensional mesh geometry of the user's head, in accordance with one or more embodiments.

FIG. 4 is a conceptual diagram that illustrates determining ATFs based on three-dimensional mesh geometry of the user's head wearing the eyewear device, in accordance with one or more embodiments.

In some embodiments, the simulation model 400 simulates propagation of sound from an audio source at different locations relative to a geometry to determine ATFs associated with the microphone array of the eyewear device. For this purpose, the geometry is of a user's head wearing the eyewear device, and is represented in three-dimensional meshes that are provided to the simulation model 400. The simulation model 400 produces the simulated ATFs for the microphone array based on the mesh geometry of the user's head wearing the eyewear device. The microphone array of the eyewear device includes a plurality of acoustic sensors, and some or all of these sensors are represented in the geometry. A single acoustic sensor can have multiple ATFs that are associated with different locations of a source relative to the acoustic sensor and/or different sound parameters (e.g., pitch, amplitude, etc.). For the acoustic sensors in the geometry (or some subset thereof), the simulation model 400 simulates propagation of sound from various points relative to the each of the acoustic sensors in the geometry. In addition to varying the relative location of the points, the simulation module 400 can also vary sound parameters (e.g., pitch, amplitude, etc.). In some embodiments, the simulation model 400 treats one or more of the acoustic sensors in the geometry as speakers (instead of microphones)—and models how sound emitted from the acoustic sensors propagates to various points relative to the acoustic sensors. Treating the acoustic sensors as speakers will require significantly less computation time during the simulation. The simulation model 400 can also vary the sound parameters of the sound being emitted by the acoustic sensors.

To obtain the simulated ATFs, the simulation model 400 may use various simulation schemes such as (i) a boundary element method (BEM) described, for example, in Carlos A. Brebbia et al., "Boundary Element Methods in Acoustics," Springer; 1 ed., ISBN 1851666796 (1991) and Gumerov N. A. et al., "A broadband fast multipole accelerated boundary element method for the three dimensional Helmholtz equation," J. Acoust. Soc. Am., vol. 125, issue 1, pp. 191-205 (2009), (ii) a finite element method (FEM) described, for example, in Thompson, L. L., "A review of finite-element methods for time-harmonic acoustics," J. Acoust. Soc. Am., vol. 119, issue 3, pp. 1315-1330 (2006), (iii) a finite-difference time-domain (FDTD) method described, for example, in Taflove, A. et. Al. "Computational Electrodynamics: The Finite-Difference Time-Domain Method," Third Edition; chap. 1,4., Artech House Publishers (2005), and Yee, K., "Numerical solution of initial boundary value problems involving Maxwell's equations in isotropic media," IEEE Transactions on Antennas and Propagation, vol. 14, issue 3, pp. 302-307 (1966), (iv) Fourier Pseudo-Spectral Time Domain (PSTD) method described, for example, in Sakamoto, S. et al. "Numerical analysis of sound propagation in rooms using the finite difference time domain method," J. Acoust. Soc. Am., vol. 120, issue 5, 3008 (2006), and Sakamoto, S. et al. "Calculation of impulse responses and acoustic parameters in a hall by the finite-difference time-domain method," Acoustical Science and Technology, vol. 29, issue 4 (2008), the contents of which are incorporated by reference herein in their entirety.

Figure 5:
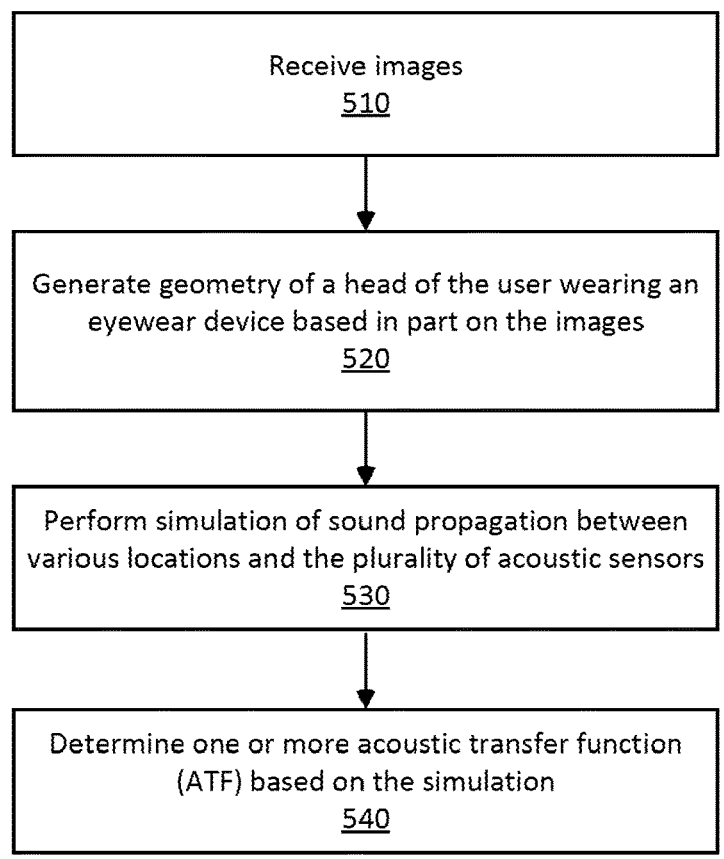
FIG. 5 is a flow diagram of determining ATFs using captured images into three-dimensional meshes, in accordance with one or more embodiments.

FIG. 5 is a flow diagram of determining ATFs using captured images into three-dimensional meshes, in accordance with one or more embodiments. In one embodiment, the process of FIG. 5 is performed by components of server 300. Other entities may perform some or all of the steps of the process in other embodiments (e.g., the eyewear device 220). Likewise, embodiments may include different and/or additional steps, or perform the steps in different orders.

The server 300 receives 510 images from an imaging device (e.g., the imaging device 200). The images may include images of the user's head, images of the user's head wearing an eyewear device, an eyewear device, a microphone array, or some combination thereof.

The server 300 generates a geometry of a head of the user wearing the eyewear device using the received images. In some embodiments, the server 300 generates a geometry of the head using images of the head, and separately generates a geometry of the eyewear device using images of the eyewear device. The server 300 then combines the two geometries into a single geometry of the head wearing the eyewear device. In some embodiments, the server 300 generates a geometry of the head wearing the eyewear device using images of the head wearing the eye wear device. In some embodiments, additional information may be obtained from touch sensors that are located on the eyewear device to provide additional contact information related to the positioning of the eyewear device with respect to the user's head. The eyewear device includes a microphone array that includes a plurality of acoustic sensors. The geometry includes at least one of the acoustic sensors and may include all of the acoustic sensors.

The server 300 performs simulation of sound propagation between various locations and at least one acoustic sensors on the eyewear device. The various locations are in a simulated local area that surrounds the geometry. Each location is a particular distance from the geometry, and different locations may be the same distance or different distances from the geometry. In some embodiments, a location may be placed anywhere within the simulated local area relative to the geometry. In other embodiments, the location may be placed at discrete locations (e.g., cells within a three dimensional grid) within the simulated local area. In some embodiments, sources are placed at the different locations and the simulation models sound propagation from the different locations to the various acoustic sensors. Alternatively, the simulation may treat the acoustic sensors as speakers and then simulate sound emitting from the acoustic sensors and propagating outward to the different locations. The simulation may also vary sound parameters (e.g., pitch).

The server 300 determines one or more ATFs based on the simulation. For each acoustic sensor, the server 300 determines an ATF that corresponds to a specific location. And in some instances there may be multiple instances of ATFs for a particular acoustic sensor and a particular location (e.g., generated using different sound parameters). In some embodiments, the server 300 determines one or more ATFS for each of the acoustic sensors based on the simulation. Note that the determined ATFs are customized to the geometry that was generated using images of the user. Accordingly, the determined ATFs are customized to the user. The server 300 provides the determined ATFs to the eyewear device (e.g., via the network 110).

ATF Determination Using PCA-Based Geometry

Figure 6A:
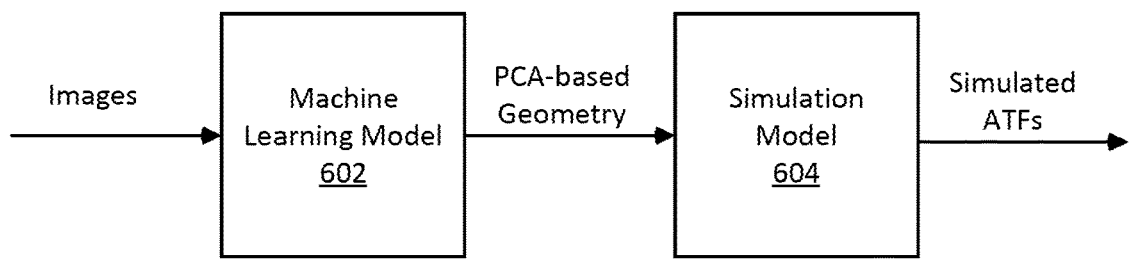
FIG. 6A is a block diagram of a machine learning model, in accordance with one or more embodiments.

FIG. 6A is a block diagram of a machine learning model, in accordance with one or more embodiments. First, the images received from an imaging device (e.g., the imaging device 200) are converted into a PCA-based geometry representing the user's head wearing an eyewear device using a machine learning model 602. The images may include, images of the user's head, images of the user's head wearing an eyewear device that includes a microphone array, an eyewear device that includes a microphone array, a microphone array, or some combination thereof.

The machine learning model 602 is trained to produce PCA-based geometry and embodies a PCA model in which a human head or shapes of the human head feature (e.g. ear shapes) wearing an eyewear device is represented as a linear combination of three-dimensional shapes of representative test subjects' heads or head feature wearing the eyewear device. In some embodiments, the machine learning model 602 is trained to produce PCA-based geometry and embodies a PCA model of an eyewear device (e.g., the eyewear device 220) that is represented as a linear combination of three-dimensional shapes of representative images of the eyewear device. The machine learning model 602 may be also trained to produce PCA-based geometry and embodies a PCA model in which a human head or shapes of a human head feature (e.g. ear shapes) are represented as a linear combination of three-dimensional shapes of representative test subjects' heads or head feature. The machine learning model 602 may combine the PCA-based geometry of the head with the PCA based geometry of the eyewear to obtain a PCA-based geometry of the head wearing the eyewear device. In some embodiments, the machine learning model 602 is trained to produce PCA-based geometry and embodies a PCA model in which a human head or shapes of the human head feature (e.g. ear shapes) wearing an eyewear device (e.g., the eyewear device 220) is represented as a linear combination of three-dimensional shapes of representative test subjects' heads or head feature's while wearing the eyewear device.

Taking an example of using PCA analysis on the shape of ears of a head wearing the eyewear device, a three-dimensional shape of a random ear shape E can be represented as follows:

$$E = \Sigma(\alpha_i \times \varepsilon_i) \quad (1)$$

where $\alpha_i$ represents i-th principal component (i.e., three dimensional i-th representative ear shape) and $\varepsilon_i$ represents PCA coefficient of the ith principal component. The number of principal components (the number of "i") is selected so that it is smaller than the total number of test subjects provided with their measured ATFs. In an example, the number of principal components is 5 to 10.

In some embodiments, the PCA model is generated using geometries of test subjects' head shapes wearing the eyewear device and their measured ATFs, as described below in detail with reference to FIG. 6B, so that the use of PCA-based geometry obtained from the PCA model yields more accurate ATFs by simulation compared to performing simulation on a three-dimensional mesh geometry of the same user head wearing the eyewear device. After the PCA model is determined, a machine learning model 602 is trained using the images of the test subjects' head wearing the eyewear device and their PCA-based geometries according to the PCA model. The trained machine learning model 602 can predict or infer the PCA-based geometries of a user's head wearing the eyewear device from the images of the user's head wearing the eyewear device. In some embodiments, the trained machine learning model 602 can predict or infer the PCA-based geometries of a user's head wearing the eyewear device from the images of the user's head and other images of the eyewear device.

The test subjects described herein refer to humans or physical models of humans for which their head shape geometries (or head shape images) and HRTFs are already known. To obtain the HRTFs, the test subjects may be placed in an anechoic chamber and exposed to sounds from different locations within the anechoic chamber with microphones placed at the test subjects' ears. In some embodiments, ATFs are measured for a test eyewear device (including a test microphone array) that is worn by the test subjects. The test eyewear device is substantially the same as the eyewear device worn by the user.

Such generation of the PCA model and the training of the machine learning model 602 can be performed offline. Then, the trained machine learning model 602 can be deployed in the geometry generation module 370 of the server 300. Using the trained machine learning model 602 enables the geometry generation module 370 to produce PCA-based geometry of a user in a robust and efficient manner.

Figure 6B:
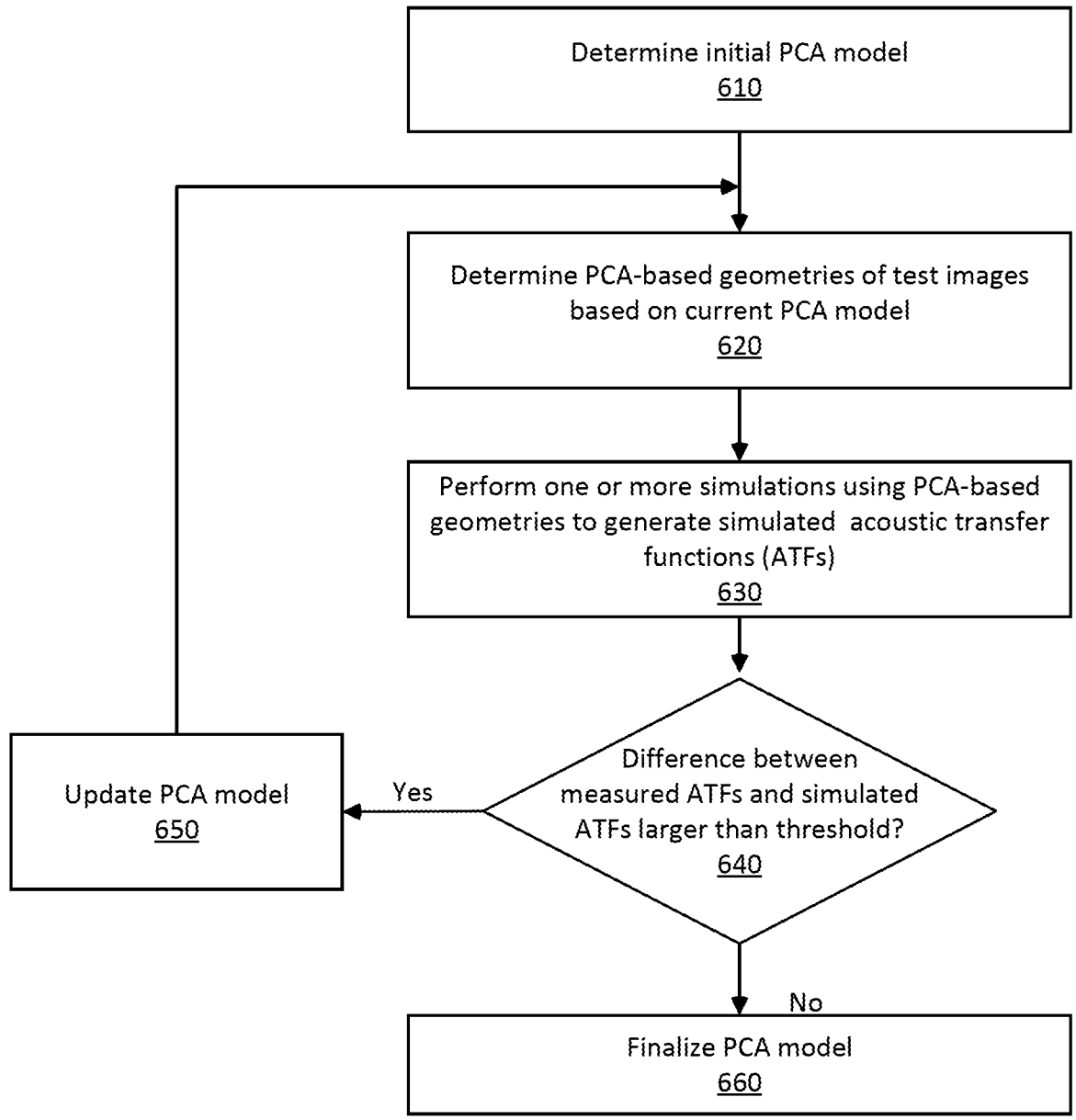
FIG. 6B is a flow diagram of determining a PCA model, in accordance with one or more embodiments.

FIG. 6B is a flow diagram of determining a PCA model, in accordance with one or more embodiments. In one embodiment, the process of FIG. 6B is performed by components of server 300. Other entities may perform some or all of the steps of the process in other embodiments. Likewise, embodiments may include different and/or additional steps, or perform the steps in different orders.

The server 300 determines 610 an initial PCA model. In some embodiments, the server 300 determines the initial PCA model by selecting a subset of the test subjects' head (or a portion thereof) as principal components for representing a random head shape or a feature of the head shape.

The server 300 determines PCA-based geometries of test images based on current PCA model. For example, the images of the test subjects' heads wearing a test eyewear device that includes a test microphone array are processed using the initial PCA model to determine PCA-based geometries of the test subjects' heads or portions of the test subjects' heads (e.g., ears) while wearing the test eyewear device. That is, all test subjects' head shapes (or shapes of portions of the heads) wearing the eyewear device are represented as a linear combination of a subset of test subjects' head shapes multiplied by a corresponding PCA coefficient, as explained above with reference to Equation (1). Note that the test eyewear device is substantially the same as the eyewear device worn by the user.

The server 300 performs 630 one or more simulations using the PCA-based geometries to generate simulated ATFs. The one or more simulations are performed on the PCA-based geometries using one or more of BEM, FEM, FDTD method, or PSTD method as described above with reference to FIG. 4. As the result of the simulation, simulated ATFs of the test subjects based on the current PCA-model are obtained.

The server 300 determines 640 whether the difference between the measured ATFs and the simulated ATFs of the test subjects are larger than a threshold. The difference may be a sum of the magnitude of the differences between the measured ATFs and the simulated ATFs for each of the test subjects.

If the difference is larger than the threshold, the PCA model is updated 650 to a new current PCA model. The updating of the PCA model may include adding or reducing the number of principal components, updating PCA coefficient values or updating the representative shapes. Then, the process returns to determining 620 new sets of PCA-based geometries based on the updated current model and repeats the subsequent steps.

If it is determined 640 that the difference is less than or equal to the threshold, the current PCA model is finalized 660 as the PCA model for deployment.

Figure 7:
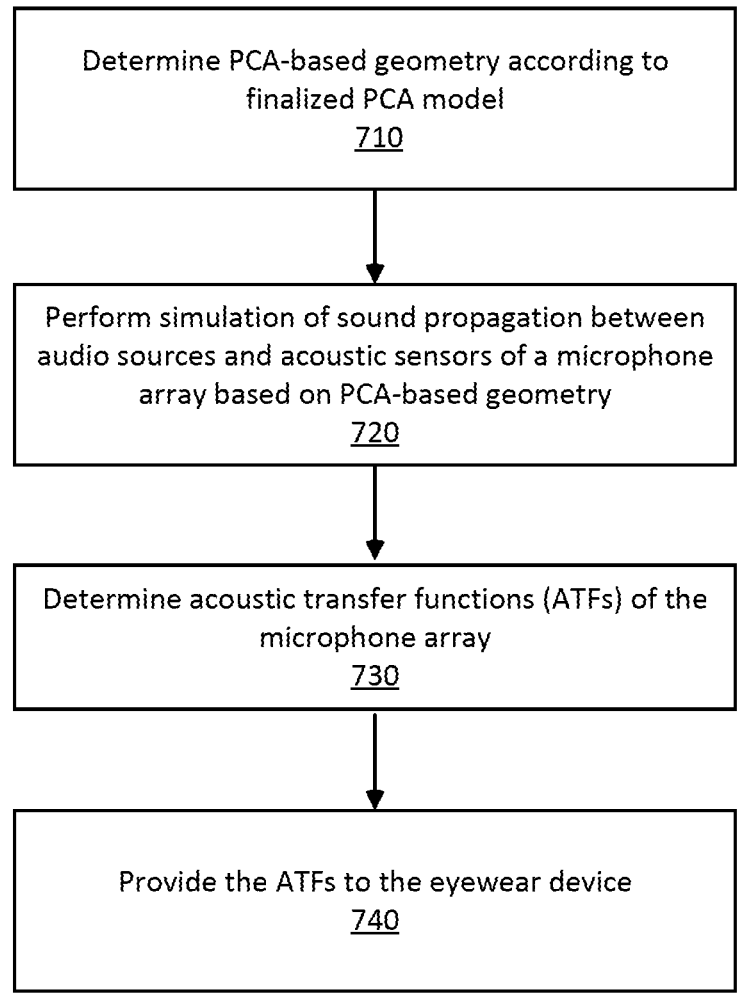
FIG. 7 is a flow diagram of determining ATFs using PCA-based geometries, in accordance with one or more embodiments.

FIG. 7 is a flow diagram of determining ATFs using PCA-based geometries, in accordance with one or more embodiments. In one embodiment, the process of FIG. 7 is performed by components of server 300. Other entities may perform some or all of the steps of the process in other embodiments. Likewise, embodiments may include different and/or additional steps, or perform the steps in different orders.

The server 300 determines 710 a PCA-based geometry of the user's head wearing the eyewear device using a finalized PCA model. The finalized PCA model is, e.g., determined as described above with reference to FIG. 6B.

The server 300 performs 720 a simulation on the PCA-based geometry of the user's head wearing the eyewear device. The simulation may use one or more of BEM, FEM, FDTD method, or PSTD method as described above with reference to FIG. 4.

The server 300 determines 730 ATFs associated with the eyewear device worn by the user based in part on the simulation. The server 300 simulates propagation of sound from an audio source at different locations relative to a geometry to determine ATFs associated with the microphone array of the eyewear device. The server 300 produces the simulated ATFs for the microphone array based on the mesh geometry of the user's head wearing the eyewear device. The microphone array of the eyewear device includes a plurality of acoustic sensors, and some or all of these sensors are represented in the geometry. A single acoustic sensor can have multiple ATFs that are associated with different locations of a source relative to the acoustic sensor and/or different sound parameters (e.g., pitch, amplitude, etc.). For the acoustic sensors in the geometry (or some subset thereof), the server 300 simulates propagation of sound from various points relative to the each of the acoustic sensors in the geometry. In addition to varying the relative location of the points, the server 300 can also vary sound parameters (e.g., pitch, amplitude, etc.). In some embodiments, the server 300 treats one or more of the acoustic sensors in the geometry as speakers (instead of microphones)—and models how sound emitted from the acoustic sensors propagates to various points relative to the acoustic sensors. The server 300 can also vary the sound parameters of the sound being emitted by the acoustic sensors. Note that the determined ATFs are customized to the geometry that was generated using images of the user. Accordingly, the determined ATFs are customized to the user.

The server 300 provides 740 the ATFs to the eyewear device. The ATFs are sent through a network (e.g., the network 110) to the eyewear device. The eyewear device uses the ATFs that are customized to the user to optimize performance of the audio system. The ATFs may be used to, e.g., improve DoA determination by the microphone array and/or beam forming.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
receiving an image of at least a portion of a head of a user;
generating a geometry of the head wearing an eyewear device based in part on the received image of the head and a geometry of the eyewear device, wherein the geometry of the eyewear device includes a microphone array composed of a plurality of acoustic sensors that are configured to detect sounds within a local area surrounding the microphone array, wherein the geometry of the eyewear device is separately generated;

performing a simulation of sound propagation between an audio source and the plurality of acoustic sensors based on the generated geometry; and determining an acoustic transfer function (ATF) associated with the microphone array based on the simulation.

2. The method of claim 1, further comprising:

receiving an image of the eyewear device; and generating the geometry of the microphone array based in part on the received image of the microphone array.

3. The method of claim 1, wherein the head in the image is wearing the eyewear device, and the method further comprises:

generating the geometry of the microphone array based in part on the image.

4. The method of claim 1, wherein the geometry is represented using a principal component analysis (PCA) model describing the head wearing the microphone array as a combination of representative three-dimensional shapes of test microphone arrays.

5. The method of claim 4, wherein the generating the geometry comprises processing the image using a machine learning algorithm to obtain the geometry.

6. The method of claim 4, wherein the PCA model is generated by:

receiving a plurality of test images of a test eyewear device including a test microphone array on different heads and measured ATFs of the microphone array;

determining PCA-based geometries of the test images based on an initial PCA model;

performing simulation on the PCA-based geometries to determine simulated ATFs of the test microphone arrays;

determining differences between the simulated ATFs and the measured ATFs;

generating, based on the determined differences, an updated PCA model by modifying the initial PCA model or by updating one or more intermediate PCA models derived from the initial PCA model; and determining the updated PCA model as the PCA model for representing the microphone array when the determined differences is below a threshold.

7. The method of claim 6, further comprising:

training the machine learning algorithm using the test images and PCA-based geometries of the test images according to the PCA model.

8. The method of claim 1, wherein the eyewear device includes an eyeglass frame with two arms that each couple to an eyeglass body, and the image includes at least a portion of one of the two arms that includes an acoustic sensor of the plurality of acoustic sensors, and at least a portion of the eyeglass body that includes an acoustic sensor of the plurality of acoustic sensors.

9. The method of claim 1, wherein the image of the microphone array is a color image.

10. The method of claim 1, wherein the image of the microphone array is a depth image.

11. The method of claim 10, wherein the image of the microphone array is captured by a depth camera assembly.

12. The method of claim 1, wherein the geometry is represented as three-dimensional meshes.

13. The method of claim 1, wherein the simulation is based on one of a finite element method (FEM), a boundary element method (BEM), and a finite-difference time-domain (FDTD) method.

14. A non-transitory computer readable storage medium storing instructions thereon, the instructions when executed by a processor cause the processor to perform steps comprising:

receiving an image of at least a portion of a head of a user;

generating a geometry of the head wearing an eyewear device based in part on the received image of the head and a geometry of the eyewear device, wherein the geometry of the eyewear device includes a microphone array composed of a plurality of acoustic sensors that are configured to detect sounds within a local area surrounding the microphone array, wherein the geometry of the eyewear device is separately generated;

performing a simulation of sound propagation between an audio source and the plurality of acoustic sensors based on the generated geometry; and determining an acoustic transfer function (ATF) associated with the microphone array based on the simulation.

15. The computer readable storage medium of claim 14, wherein the geometry is represented using a principal component analysis (PCA) model describing the head wearing the microphone array as a combination of representative three-dimensional shapes of test microphone arrays.

16. The computer readable storage medium of claim 15, wherein the generating the geometry comprises processing the image using a machine learning algorithm to obtain the geometry.

17. The computer readable storage medium of claim 14, wherein the instructions when executed by the processor further cause the processor to perform steps comprising:

receiving a plurality of test images of a test eyewear device including a test microphone array on different heads and measured ATFs of the microphone array;

determining PCA-based geometries of the test images based on an initial PCA model;

performing simulation on the PCA-based geometries to determine simulated ATFs of the test microphone arrays;

determining differences between the simulated ATFs and the measured ATFs;

generating, based on the determined differences, an updated PCA model by modifying the initial PCA model or by updating one or more intermediate PCA models derived from the initial PCA model; and determining the updated PCA model as the PCA model for representing the microphone array when the determined differences is below a threshold.

18. The computer readable storage medium of claim 17, wherein the instructions when executed by the processor further cause the processor to perform steps comprising:

training the machine learning algorithm using the test images and PCA-based geometries of the test images according to the PCA model.

19. The computer readable storage medium of claim 14, wherein the eyewear device includes an eyeglass frame with two arms that each couple to an eyeglass body, and the image includes at least a portion of one of the two arms that includes an acoustic sensor of the plurality of acoustic sensors, and at least a portion of the eyeglass body that includes an acoustic sensor of the plurality of acoustic sensors.

20. The computer readable storage medium of claim 14, wherein the simulation is based on one of a finite element method (FEM), a boundary element method (BEM), and a finite-difference time-domain (FDTD) method.

* * * * *